United States Patent [19]

Brems et al.

[11] 4,359,945
[45] Nov. 23, 1982

[54] GRAVITY TROLLEY CONVEYOR WITH SPEED CONTROL

[75] Inventors: John H. Brems, 32867 White Oaks Trail, Birmingham, Mich. 48010; John L. Vaphiadis, Royal Oak, Mich.

[73] Assignee: F. Jos. Lamb Company, Warren, Mich.; by said John L. Vaphiadis, a part interest

[21] Appl. No.: 215,029

[22] Filed: Dec. 10, 1980

[51] Int. Cl.³ .................................................. B61B 3/00
[52] U.S. Cl. ........................................ 104/89; 104/93; 105/148; 198/473; 188/290
[58] Field of Search ............... 198/472, 473; 104/89, 104/93; 105/148, 150; 188/267, 290

[56] References Cited

U.S. PATENT DOCUMENTS

| | | | |
|---|---|---|---|
| 2,312,188 | 2/1943 | Patz | 105/150 |
| 2,832,298 | 4/1958 | Ambli | 105/150 |
| 4,098,375 | 7/1978 | Kornylak | 188/290 |
| 4,215,772 | 8/1980 | Graham | 188/290 |
| 4,316,535 | 2/1982 | Brems et al. | 188/290 |

Primary Examiner—Joseph E. Valenza
Attorney, Agent, or Firm—Barnes, Kisselle, Raisch & Choate

[57] ABSTRACT

A gravity conveyor has a work supporting trolley provided with multiple wheels of different diameters fixed to a shaft that operates a retarder for applying a retarding torque to the wheels proportional to their angular velocity. The conveyor track consists of multiple, laterally spaced, resiliently flexible rails on which selective wheels of the trolley are adapted to roll. The axial spacing of the tracks and wheels simplifies the location of the two centers of gravity of the loaded and unloaded trolley.

12 Claims, 9 Drawing Figures

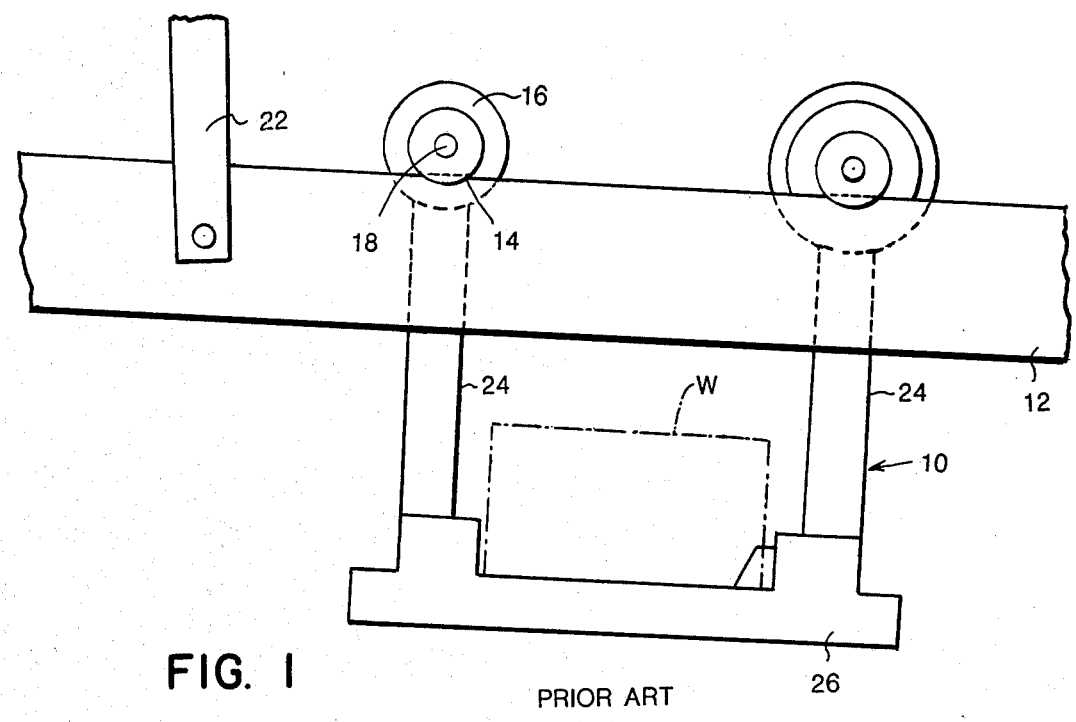
FIG. 1 PRIOR ART
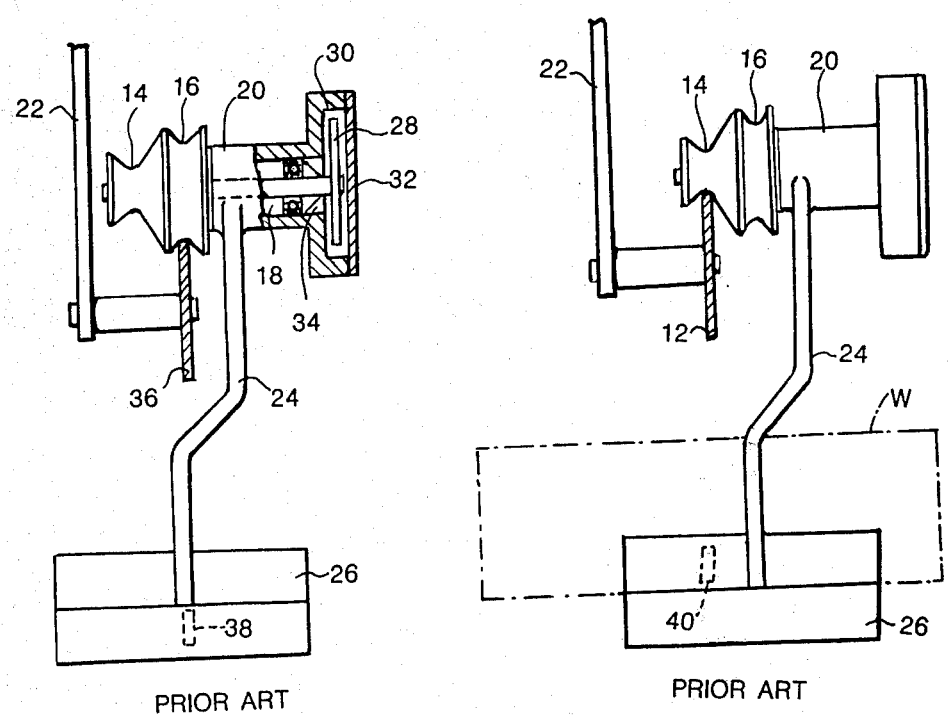
FIG. 2 PRIOR ART
FIG. 3 PRIOR ART

GRAVITY TROLLEY CONVEYOR WITH SPEED CONTROL

This invention relates to conveyors and, more particularly, to conveyors that utilize work supporting trolleys that are supported by wheels that run on inclined trolley tracks and are powered by gravity.

In the conveyor field where workpieces are conveyed by trolleys running on downwardly inclined tracks, such arrangements are known as pallet conveyors. In conveyors of this type the speed of the trolley increases until its terminal velocity is obtained or until the trolley is stopped by some mechanical means, such as a barrier, or by abutting against the last trolley in a queue of trolleys at rest. This results in an impact that can be destructive to the trolley, the workpiece, or both.

Various means have been heretofore proposed to control the velocity of such trolleys. One of the most commonly used devices is a retarding brake torsionally attached to a trolley wheel. In one form of retarding brake the rotating member of the retarder is confined in a cavity that contains a viscous fluid. The retarding brake can be so designed that the resistance caused by the viscous fluid between the stationary wall of the cavity and the adjacent surface of the rotating member results in a desired low velocity. The use of a retarder of this type is satisfactory only in those arrangements where the wheels of all of the trolleys are uniformly loaded at all times. However, in most conveyor arrangements of this type the trolley wheels are not uniformly loaded at all times. At one time the trolley is empty and the load on the trolley wheels is the weight of the trolley itself. At other times the trolley carries a workpiece and the load on the trolley is therefore the combined weight of the trolley and the weight of the workpiece. In order to achieve satisfactory low velocity of the trolley under both conditions of loading it is necessary to employ a mechanism capable of applying two different retarding forces to the trolley.

In Brems U.S. Pat. No. 4,316,535 dated Feb. 23, 1982, the desired low velocity of the trolley under both conditions of loading is obtained by employing a trolley wheel having two different diameter portions on the same axis connected to a single retarder, the guiding trolley track being designed such that when the trolley is loaded the smaller diameter wheel engages the track and, when the trolley is empty, the track is engaged by the larger diameter wheel. This arrangement has proven to be very successful in many applications.

One of the problems that arises in connection with such speed control trolleys is the desirability or the necessity of maintaining the work supporting pallet of the trolley substantially level at all times, whether loaded or unloaded. The problem of maintaining the pallet level and laterally stable can be solved to some extent by utilizing a track in the form of a rectangular tube. However, a rectangular tube track presents other problems which makes its use impractical. In the first place, rectangular tube tracks cannot be readily formed into the desired curved and spiral configurations required for the path of travel of most overhead gravity conveyors. Thus, the cost of a rectangular tubular conveyor track of this configuration would be prohibitive. In addition, where a trolley designed for use with a rectangular tube track is provided with longitudinally spaced sets of axially opposed wheels, substantially difficulty is encountered in attempting to cause the trolley to negotiate turns in the track which curve at a relatively short radius.

A more practical and economical conveyor track for suspended trolleys consists of upright rails in the form of thin strips of steel having spring characteristics which can be hand formed into smooth curves and spirals. Trolley wheels rolling on the upper edges of such rails provide an ideal conveyor arrangement. However, the use of a trolley track in the form of a thin upright rail with retarders having dual diameter wheels presents another problem.

Where the dual diameters of the wheels are on the same axis, the center of gravity of the empty pallet should be substantially directly below the center of the profile of the larger diameter wheel in order to maintain the pallet level. Likewise, the workpiece should be located on the pallet so that the center of gravity of its mass plus the mass of the trolley will be substantially directly below the profile of the smaller wheel. When these two conditions are met the empty pallet and the loaded pallet will both be suspended in a level condition during the travel down the incline of the conveyor track. In practice determining these centers of gravity with sufficient accuracy is very difficult. This problem is compounded by the fact that, when the trolley is designed, the workpiece itself to be conveyed is not available, but only dimensioned drawings thereof.

The primary object of this invention is to provide a conveyor of the above described type which utilizes thin flexible rails for the trolley track and which is designed so that a determination of the centers of gravity of the loaded and unloaded pallets is not critical.

A more specific object of the invention resides in the provision of a trolley having a pair of laterally spaced thin upright rails simultaneously engaged by wheels of the same diameter so that the loaded or unloaded trolley is supported by two laterally spaced tracks. With such an arrangement, as long as the center of gravity falls some where between the two laterally spaced tracks, the trolley will hang vertically and the pallet will remain level.

Other objects, features and advantages of the present invention will become apparent from the following description and accompanying drawings, in which:

FIG. 1 is a side elevational view of a gravity trolley conveyor of the prior art;

FIG. 2 is an end view partly in section of the conveyor shown in FIG. 1 and showing the larger diameter wheel portion engaging the track;

FIG. 3 is a view similar to FIG. 2 and showing the smaller diameter wheel engaging the track;

Figure 5:
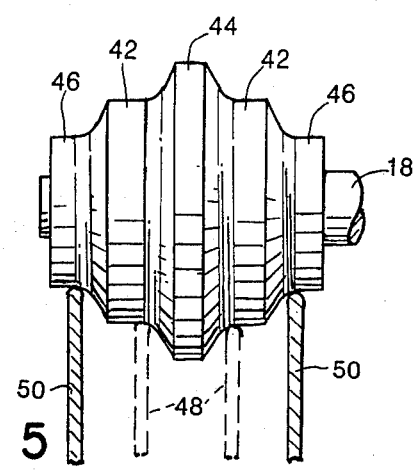
Figure 6:
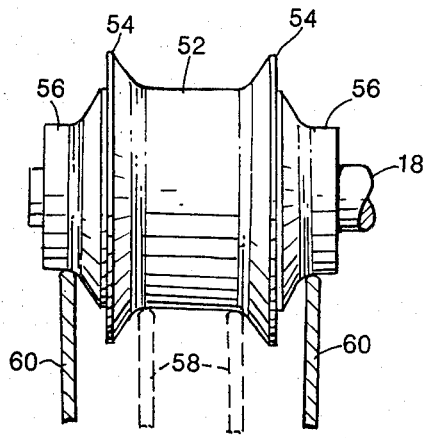
Figure 7:
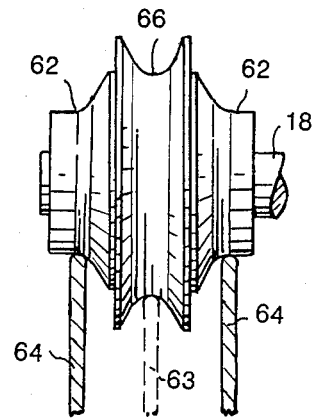
Figure 8:
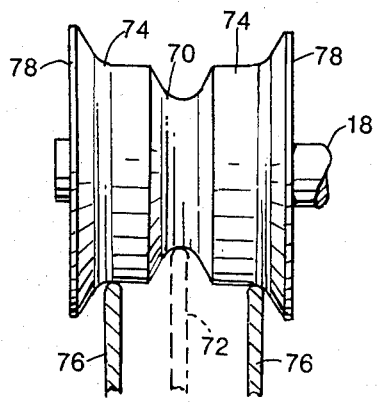
Figure 9:
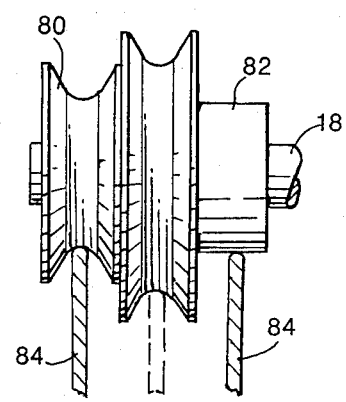

FIGS. 5 and 6 illustrate trolley-track arrangements utilizing two sets of multiple wheels of different diameters and two sets of tracks; and FIGS. 7, 8 and 9 illustrate trolley-track arrangements utilizing two sets of trolley wheels, one set having two wheels of one diameter and the other set having one wheel of a different diameter, and two sets of tracks, one set having two tracks and the other set having a single track.

A trolley conveyor arrangement illustrated in FIGS. 1 through 3 is generally similar to one form shown and described in the aforesaid Brems U.S. Pat. No. 4,316,535. The trolley, generally designated 10, is supported on a thin rail track 12 by two sets of wheels. Each set of wheels comprises a smaller diameter wheel 14 and a large diameter wheel 16, both fixed on an axle 18 journalled in a retarder housing 20. Track 12 is inclined downwardly and is suspended from a suitable overhead structure by hangers 22. Each trolley also includes a pair of depending arms 24 fixed at their upper ends to the retarder housings 20 and supporting a pallet 26 for a workpiece W at their lower ends. It will be noted that pallet 26 extends laterally outwardly beyond wheels 14,16 and that the workpiece W in the arrangement shown overhangs each side of the pallet.

Within each retarder housing 20 there is arranged on the inner end of axle 18 a disc 28 located within an enlarged circular cavity 30. Cavity 30 is closed at one end by a cover plate 32 and is sealed from the tubular portion of housing 20 in which axle 18 is journalled by a suitable seal 34. Cavity 30 is filled with a viscous fluid which exhibits substantially Newtonian characteristics, such as silicone oil. It will be understood that in such a Newtonian fluid the shear force required to shear the fluid is directly proportional to the time rate of shear exerted on the fluid. Therefore, the retarding force exerted on axle 18 by disc 28 is directly proportional to the angular velocity of axle 18. The factor of proportionality is dependent upon the viscosity of the fluid, the diameter of disc 28 and the thickness of the fluid space on opposite sides of the disc within cavity 30.

In FIGS. 1 and 3 trolley 10 is shown loaded with a workpiece W and suspended from track 12 by the small diameter wheels 14. When trolley 10 is empty, it will be supported on a similar track 36 by the larger diameter wheels 16. Tracks 12 and 36 can be the same track, in which case means are provided for shifting the trolley laterally when loaded or unloaded. However, tracks 12 and 36 can be laterally offset extensions of each other. The use of different diameter wheels enables independent control of the speeds of the empty and the loaded pallets.

Figure 4:
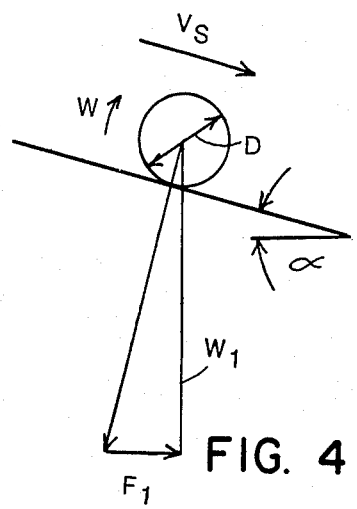
FIG. 4 is a velocity force vector diagram illustrating the basic principle involved in a conveyor of the present invention.

The effect of the rolling diameter on the speed of descent along the downwardly inclined track may be understood by reference to FIG. 4, a schematic velocity and force vector diagram of a wheel supporting a weight $W_1$ having a diameter $D_1$, and rolling down a track inclined to the horizontal at a constant angle $\alpha$, and moving with an angular velocity $\omega$ and linear velocity V. It can be seen that the force, parallel to the track, causing the wheel to move forward is:

$$F_1 = W_1 \sin \alpha$$

This in turn creates a forward torque $T_F$ on the wheel $$T_F = F_1(D_1/2) = (D_1/2) W_1 \sin \alpha$$

As the wheel rolls down the track and substantial equilibrium is reached, i.e., the wheel is neither accelerating nor decelerating, the forward torque $T_F$ and the retarding torque $T_R$ are equal (and opposite). The retarding torque may be expressed as:

$$T_R = K_1 \omega$$

Since $\omega = \dfrac{\frac{V}{D_1}}{2}$ where V is the equilibrium velocity, $$T_R = 2K_1 V/D_1$$

Since $T_F = T_R$ $$(D_1/2) W_1 \sin \alpha = 2K_1 V/D_1$$

Solving for V
$$V = (\sin \alpha / 4K_1) W_1 D_1^2$$

where $W_E$ and $W_F$ are the empty and full weights respectively and $D_E$ and $D_F$ are the rolling diameters for the empty and full conditions respectively. This condition can be expressed also as:

$$D_E = D_F(W_F/W_E)$$

This equation indicates that the equilibrium forward rolling velocity is proportional to the weight and the square of the rolling diameter. In the specific case where it is desired to have the rolling velocity of an empty pallet equal the rolling velocity of a full pallet, it can be seen that:

$$W_E D_E^2 = W_F D_F^2$$

In FIG. 2 where pallet 26 is shown empty and the trolley is supported on the large diameter wheel 16, pallet 26 is suspended from housing 20 so that its center of gravity lies in a vertical plane within the profile of wheel 16. When the pallet is so located relative to wheel 16, it will remain substantially level in a lateral sense as it travels down the track. Thus, we can assume that the center of gravity of the empty trolley is approximately at the location designated 38 in FIG. 2.

In FIG. 3 where the pallet 26 carries the additional load of workpiece W and is suspended on the track by means of the small diameter wheel 14 an additional problem confronts the conveyor designer. In order to maintain pallet 26 horizontally level during its travel along the track, the workpiece locator 40 on pallet 26 must be precisely positioned so that the center of gravity of the total mass of the loaded trolley will be substantially directly below the outline of small diameter wheel 14. As mentioned previously, the difficulty of this determinatin is compounded because at the time of design all of the trolley components and even the workpiece are represented only by dimensioned drawings. Thus, the precise relative location of wheels 14,16 and pallet 26 is virtually impossible. Even a very close approximation is very difficult.

In FIGS. 5 through 9, which show various embodiments of the present invention, a complete trolley is not illustrated since it differs from the trolley 10 illustrated in FIGS. 1 through 3 only in the construction and arrangement of the track engaging wheels. In FIG. 5 the wheel arrangement consists of two large diameter wheels 42 separated by a flange 44 and located between two small diameter wheels 46. Although four separate wheels may be used, they are shown formed as a single multiple diameter wheel fixedly mounted on the axle 18 of the retarder. The larger diameter wheels 42 are arranged for rolling engagement with tracks 48 when the trolley pallet is empty and the smaller diameter wheels are arranged for rolling engagement with the tracks 50 when the trolley pallet is loaded. It will be appreciated that, when the pallet is not loaded, the center of gravity of empty trolley need not fall between the two tracks 48 and, when the pallet is loaded, the center of gravity of the loaded trolley may fall anywhere between the two outer tracks.

In accordance with this invention all of the tracks, such as illustrated at 48,50, are in the form of thin upright rails, preferably made of a high carbon strip steel that has been heat treated so as to have the characteristics of a spring. This material is known in the steel industry as "blue tempered spring steel." It is relatively hard and difficult to machine with conventional cutters, but can be readily pierced and sheared with common sheet metal tools. Tracks formed on this material cannot only be hand formed into smooth curves and spirals, but is also highly desirable because of its unique wearing and scuff resistant qualities. These rails have the advantage of being shop-prepared with holes and slots and then coiled for shipment to the construction site for conveyor assembly and erection. The manner in which these rails can be assembled for gravity chuting is well known, extensively used, and shown in U.S. Pat. No. 2,815,841.

In the wheel arrangement shown in FIG. 6 a wide large diameter wheel 52 formed with flanges 54 at each side thereof is located between small diameter wheels 56. When the pallet is empty the trolley is supported by wheel 52 on the laterally spaced tracks 58 and when the pallet is loaded the trolley is supported by wheels 56 on the outer tracks 60. The wheel arrangement shown in FIG. 6 is essentially the same as that shown in FIG. 5 except that the flanges 54 are located laterally outwardly of the two tracks 58 whereas the flange 44 in FIG. 5 is located between the two tracks 48. The arrangement shown in FIG. 6 is particularly useful where the trolleys are suspended in a storage area without rails. The laterally spaced large diameter flanges 54 are adapted to bear on flat surfaces with stability.

In the arrangement shown in FIG. 7, when the trolley is loaded it is supported by the laterally spaced small diameter wheels 62 on the laterally spaced rails 64. The unloaded trolley, where its attitude and stability are not critical, is supported by the single large diameter wheel 66 on the single track 68. The arrangement shown in FIG. 8 is the reverse of that shown in FIG. 7 in that when the pallet is loaded it is supported by the small diameter wheel 70 on the single track 72 and when the pallet is empty it is supported by the large diameter wheels 74 on the laterally spaced tracks 76. The enlarged peripheral flanges 78 at the laterally outer sides of wheels 74 allow for stable storage of the trolleys as discussed above with respect to flanges 54 in FIG. 6.

The arrangement shown in FIG. 9 is functionally the same as that shown in FIG. 7. However, one small diameter wheel 80 has a grooved periphery while the other small diameter wheel 82 has a straight cylindrical outer periphery. With this arrangement the spacing of the two outer tracks 84 is not critical.

Although FIGS. 5 through 9 show both tracks simultaneously engaged by the two wheel sets, it will be appreciated that the two tracks are not co-extensive in length. The track rails shown in broken lines are actually located at a different section of the conveyor from the track rails shown in solid lines. For example, in the arrangement shown in FIG. 5 rails 48 will form one section of the conveyor track traversed by the trolley when empty and rails 50 will form a different section of the conveyor track traversed by the trolley when loaded.

It will be appreciated that the preferred form of trolley has two wheel assemblies of the type shown in FIGS. 5 through 9, located fore and aft of the trolley so as to prevent the trolley from swaying in the direction of travel. Likewise, when the trolley is traveling along the laterally spaced double tracks, it is stable and not subject to lateral sway. This is particularly advantageous when going around corners and curves. Thus, the trolley-track arrangement disclosed herein overcomes the practical problems encountered with respect to prior art arrangements. The necessity for determining the exact location of the center of gravity of loaded and empty trolleys is not critical, as is the case with the arrangement shown in FIGS. 1 and 3. At the same time, the problems involved with the use of a rectangular tube track are completely eliminated.

We claim:

1. A gravity conveyor comprising first and second downwardly inclined tracks, the first track comprising two resiliently flexible, thin upright rails laterally spaced in generally parallel relation, the second track comprising at least one resiliently flexible, thin upright rail, a trolley suspended from said tracks and adapted to support and convey a workpiece therealong, said trolley comprising a retarder assembly, an arm depending from said retarder assembly and a support member at the lower end of said arm adapted to be loaded with a workpiece, said retarder assembly including a bracket, an axle journalled on said bracket for rotation on a generally horizontal axis, a retarder mechanism operably connected with said axle and responding to the angular velocity of the axle to apply a retarding torque thereto, first and second wheel sets fixed to the axle to rotate therewith, the first wheel set comprising two wheels of the same diameter spaced axially apart on said shaft to correspond with the lateral spacing of the rails of the first track so as to roll on the upper edges of said rails, the second wheel set comprising at least on wheel of different diameter than the wheels of the first set and adapted to roll on the upper edge of the rail of the second track, the two tracks being arranged such that, when the trolley is loaded with a workpiece, the wheel set of smaller diameter is arranged to roll on the rails of one of said tracks and, when the trolley is not loaded with a workpiece, the wheel set of larger diameter is adapted to roll on the rails of the other track.

2. A conveyor as called for in claim 1 wherein said wheels are spaced apart axially on said shaft so that the center of gravity of an empty trolley is aligned generally vertically within the axial extent of one wheel set and the center of gravity of the loaded trolley is aligned generally vertically within the axial extent of the other wheel set.

3. A conveyor as called for in claim 2 wherein the wheels of the second set are located axially between the wheels of the first set.

4. A conveyor as called for in claim 2 wherein the larger diameter wheels are located axially between the smaller diameter wheels so that the axial extent of the wheel set of smaller diameter is greater than the axial extent of the wheel set of larger diameter.

5. A conveyor as called for in claim 1 wherein the first wheel set comprises two larger diameter wheels, each larger diameter wheel having a peripheral surface adapted for rolling engagement with the upper edges of said rails, and a peripheral flange extending radially outwardly from said peripheral surface.

6. A conveyor as called for in claim 5 wherein said flanges are located at the laterally outer sides of the larger diameter wheels so that they are spaced apart laterally a distance greater than the spacing between the rails of the first track.

7. A conveyor as called for in claim 1 wherein each wheel set comprises at least two wheels of the same diameter and the two tracks each comprise at least two rails spaced apart to correspond with the axial spacing of the wheels in the corresponding wheel set.

8. A conveyor as called for in claim 7 wherein both of the larger diameter wheels are located axially between the two smaller diameter wheels.

9. A conveyor as called for in claim 1 wherein said work support member comprises a pallet extending laterally outwardly beyond the axially opposite end wheels on the axle.

10. A conveyor as called for in claim 1 wherein the wheels of the first set have the smaller diameter and are located one each on the axially opposite sides of the second wheel set so as to maintain the loaded trolley in a laterally stable condition when engaged with the two rails of the first track.

11. A conveyor as called for in claim 1 wherein the trolley is provided with said first and second wheel sets at both the forward and rearward ends thereof.

12. A conveyor as called for in claim 1 wherein the two tracks are spaced apart in a longitudinal direction.

* * * * *